Dec. 8, 1959  R. PABST ET AL  2,915,935
PLURAL LENS OPTICAL SCREEN
Filed Feb. 13, 1956  3 Sheets-Sheet 1
FIG_1
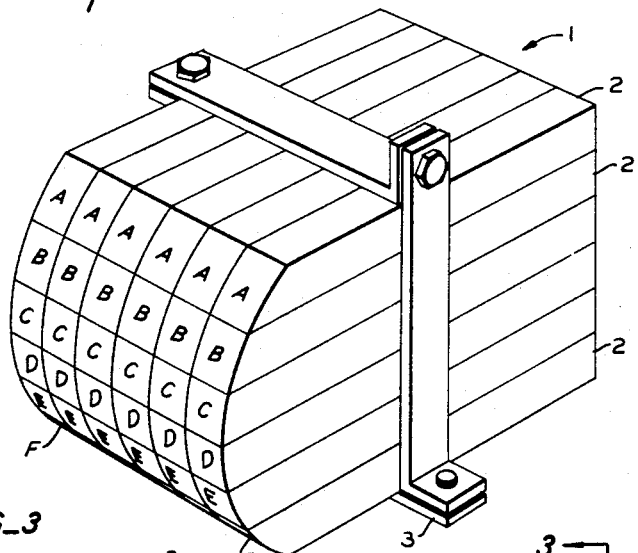
FIG_3
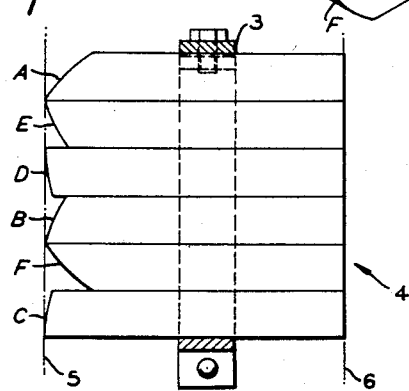
FIG_2
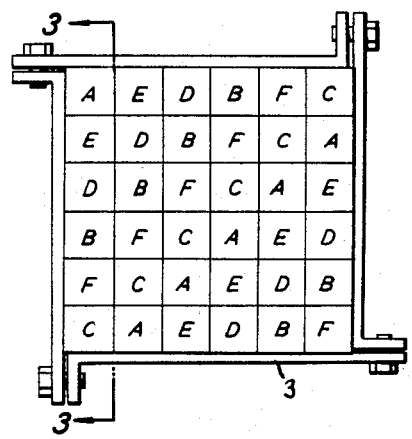
FIG_4
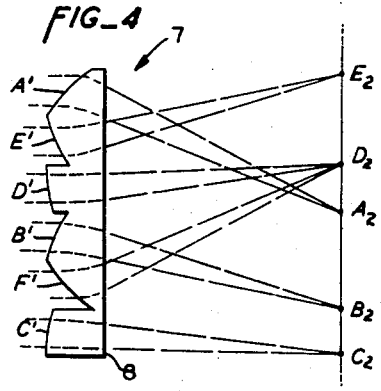
INVENTORS
RUDOLF PABST
WILLIAM E. THOMAS
BY
ATTORNEYS Dec. 8, 1959 R. PABST ET AL 2,915,935
PLURAL LENS OPTICAL SCREEN
Filed Feb. 13, 1956 3 Sheets-Sheet 2
FIG_5
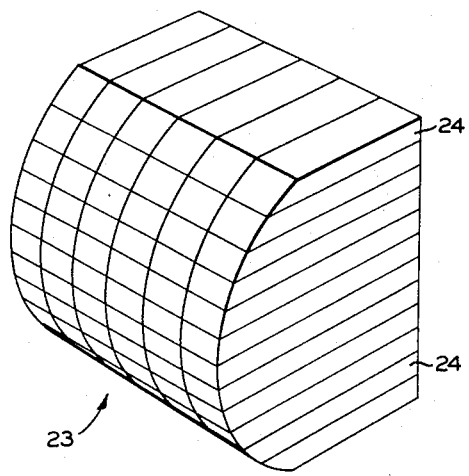
FIG_6
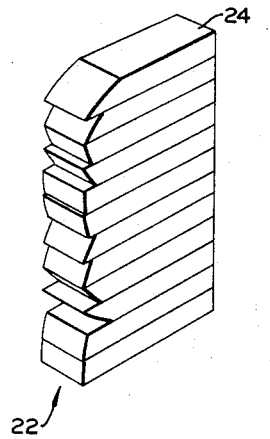
FIG_7
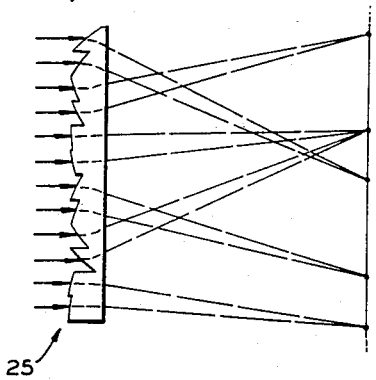
FIG_8
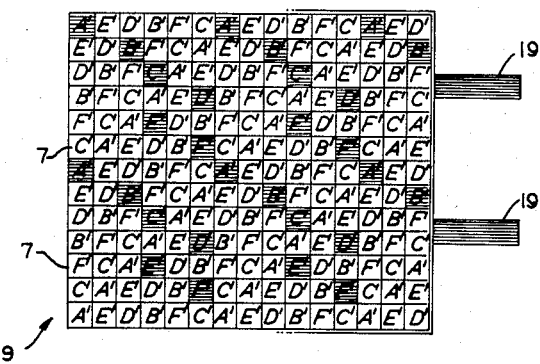
INVENTOR.
RUDOLF PABST
WILLIAM E. THOMAS
BY
ATTORNEYS

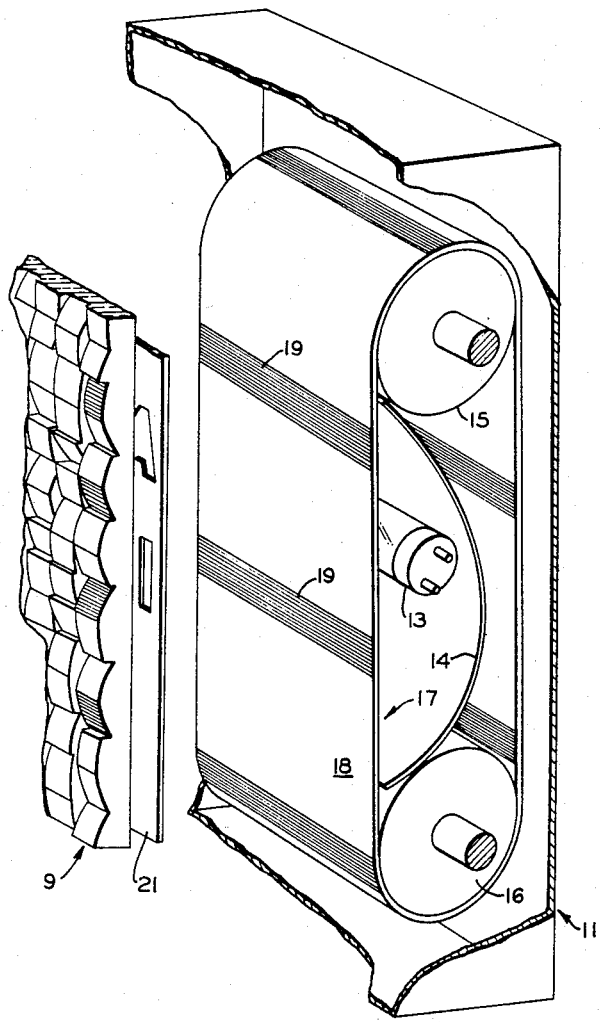

United States Patent Office 2,915,935
Patented Dec. 8, 1959

2,915,935

PLURAL LENS OPTICAL SCREEN

Rudolf Pabst, San Mateo, and William E. Thomas, San Francisco, Calif., assignors to Prisms Signs Inc., San Mateo, Calif., a corporation of California Application February 13, 1956, Serial No. 565,120

7 Claims. (Cl. 88—1)

This invention relates to and in general has for its object the provision of an optical screen for use in animated signs, to the provision of screen sections for making such screens, to the provision of a die for use in making such screen sections, and to a method of producing such die.

As is well known, all of the rays of light passing through a plano-convex spherical lens in parallelism with the optical axis thereof, converge respectively to a point lying on or intersecting the optical axis of the lens and lying on its focal plane. As a matter of fact, each portion or segment of such a lens functions in this manner, for all such segments have identical radii of curvature and all of them have a common optical axis, and therefore, a common focal plane.

Similarly, each portion of a plano-convex cylindrical lens focuses light passing through it on a common focal line lying on the focal plane of the lens. Such a lens, however, instead of having an optical axis may be considered as having an optical axial plane, the line of intersection of this plane with the focal plane being the focal line of the lens. If the curvature of the lens is from top to bottom, the optical axial plane of the lens will be horizontal.

If a spherical lens of the character referred to is actually cut into rows and columns of segments parallel with its axis and any such segment (other than the segment containing the optical axis of the lens) is rotated about its longitudinal center line (not optical axis), its optical axis will have been laterally displaced so that it is no longer coaxial with the optical axis of the original lens. The refracting surface of such segment can likewise be said to be displaced from the optical axis of the lens. However, the focal point of the rotated segment will still lie on the focal plane of the original lens and will intersect the optical axis of the lens segment. A similar displacement of the focal point of a lens segment can be obtained by displacing it laterally from its original position.

If a cylindrical lens of the character referred to be cut into rows and columns of square lens segments and one of such lens segments be rotated through 90 degrees, its focal line will be correspondingly rotated through the same angle and will be vertical rather than horizontal, but will still lie on the focal plane of the lens. If the position of two dissimilar lens segments of any two rows of segments be interchanged, their focal lines will still lie on the common focal plane, but they will be vertically spaced from each other and from the focal line of the lens. It will therefore be seen that by resorting to this expedient, it is possible to rearrange the segments of a segmented lens in such an order that their focal points or focal lines are scattered over their common focal plane.

If in such a system a bundle of light rays is made to originate from each focal point or line and diverge towards its corresponding lens segment, each such bundle will pass through its corresponding lens segment and emerge therefrom as a parallel bundle of rays, and the entire front face of the segmented lens will be brilliantly illuminated. By moving an opaque band in front of the local plane to thereby progressively intercept each row of bundle of rays, the corresponding lens segments will be progressively blacked out in the order in which the focal points or lines of the lens segments occur in the focal plane. More specifically, various lens segments in various rows and columns would be first blacked out, and then various segments in various other rows and columns would be blacked out, etc., until the opaque band had completely traversed or scanned the focal plane. Thus a twinkling effect of an indiscriminate pattern would be produced on the front of the segmented lens.

If the opaque band be replaced by a color filter, the affected lens segments will appear colored rather than black.

By merely placing a stencil bearing some picture, symbol, indicia, etc. over the segmented lens, the device can be made to serve as an animated sign.

More specifically, one of the objects of this invention is the provision of a segmented optical screen or section thereof, of the character above described, and comprising a plurality of contiguous, dissimilar segments of a single lens arranged in an order differing from the order or arrangement in which said segments occurred in said single lens, and wherein the focal points or lines of said segments lie in spaced relationship in the focal plane of said single lens.

Another object of this invention is the provision of a die for use in making such optical screen and which comprises a rigid solid bundle of lens segments so arranged that although all of said segments focus on a common plane, their focal points or lines intersect said plane at spaced points thereon.

Still another object of this invention is the provision of a method for making a die of the character above described and which comprises forming a plurality of identical polygonal bars into a rigid, solid bundle, forming a curved lens surface on one end of said bundle, separating said rods and arranging them in a different order, and then securing the rearranged bars into a second rigid, solid bundle.

Still another object of this invention is the provision of an optical screen of the character above described, but of reduced thickness, and wherein two identical and adjacent lens segments are substituted for each one of the lens segments previously referred to.

The invention possesses other advantageous features, some of which, with the foregoing, will be set forth at length in the following description where those forms of the invention which have been selected for illustration in the drawings accompanying and forming a part of the present specification, are outlined in full. In said drawings, one form of the invention is shown, but it is to be understood that it is not limited to such form, since the invention as set forth in the claims may be embodied in other forms.

Referring to the drawings:

Fig. 1 is an isometric projection of a rigid, solid rectangular block of identical bars, one end of which has been formed with a convex, cylindrical surface.

Fig. 2 is a front elevation of a bundle of bars made up of the bars illustrated in Fig. 1, but rearranged in an order differing from the order in which they occurred in the bundle shown in Fig. 1.

Fig. 3 is a vertical section taken on the section line 3—3 of a screen section such as illustrated in Fig. 2.

Fig. 4 is a vertical section taken through an optical screen section made by using the bundle of bars shown in Figs. 2 and 3 as a die or hob, and wherein the vertical displacement of their focal lines has been diagrammatically illustrated.

Fig. 5 is an isometric projection of a bundle of bars similar to the bundle illustrated in Fig. 1, but wherein the depth of the bars is equal to only one half of their width.

Fig. 6 is an isometric projection of one column of a bundle of rows in which the bars thereof have been rearranged in an order differing from the order in which they occurred in the original or statring bundle, but in pairs.

Fig. 7 is a section taken through an optical screen section made by using the bundle of Fig. 6 as a die or hob, and wherein the vertical displacement of the focal lines of the lens segments has been diagrammatically illustrated.

Fig. 8 is a front elevation of an optical screen made up of a plurality of repetitive sections, and wherein the effect on its lens segments of a light interceptor located at their common focal plane has been diagrammatically illustrated.

Fig. 9 is an exploded isometric projection of a sign embodying the optical lens screen of our invention.

Die and method of preparation

As illustrated in Fig. 1, the first step required for producing a die embodying the objects of our invention is to make up a solid bundle 1 of identical steel bars 2 of square cross-section and tightly securing said bundle by any suitable means such as a printers' chase 3. Although for purposes of illustration six rows and six columns of square bars have been shown, making a total of thirty-six bars, any other number of rows and columns can be used, and the bars can be of rectangular, triangular, or hexagonal cross-section.

This having been done, one end of the bundle is formed with a cylindrical surface by any suitable method such as by machining and grinding. Although as illustrated in Fig. 1, the bundle has been curved from top to bottom, the direction of curvature is immaterial. By this means, each of the corresponding ends of the bars 2 constitutes a segment of a cylinder, the segments in each row of segments being identical. For ready reference, the cylindrical segments in each column of segments have been designated by the letters A to F, respectively. It should here be observed that if the center of the radius of the cylindrical surface formed on the bundle 1 of the bars 2 is located on the median plane of the bundle, the segments A and F will be identical, and likewise, the pairs of segments B and E, and C and D. Actually, in such a system there are only three different kinds or types of segments.

However, by removing the printers' chase 3, the 36 bars therein can be rearranged as indicated in Figs. 2 and 3 in an order different than they occurred in the bundle 1, and then fastened by the printers' chase 3 into a new bundle 4 with their curved ends all touching or lying on a common vertical transverse plane 5. Preferably, the curved ends of the bars 1 are chromium plated and polished prior to securing them into the bundle 4 so as to give them a surface more closely approximately a true optical surface, although this is entirely optional. Finally, the square ends of bars are machined off so as to lie in a common vertical plane 6 capable of being backed by a steel plate if necessary.

Method of making mold and optical screen

The bundle 4 can then be used as a die or hob for forming an impression or mold strictly conforming to the segmented or curved end of the bundle and such mold can then be used in any well known manner to produce a transparent, lentiform, optical screen section 7, having a smooth rear side 8 and lens segments A' to E' (Fig. 4), or into an optical screen 9 (see Fig. 8) comprising a plurality of contiguous and integral screen sections 7. Since the technique of producing such molds, and the end product therefrom, is well known in the art, it is deemed unnecessary to here set forth the details thereof.

Function of optical screen

As already generally described, and as illustrated in Figs. 4 and 5, and 8, each of the optical screen sections is formed on its front face with lens segments A', B', C', D', E', and F' corresponding to the cylindrical segments A to E, respectively, of the various bars 1, and occurring in the same order as the order of the bar segments in the rearranged bundle 4. As so arranged, the focal lines $A_2$, $B_2$, $C_2$, $D_2$, $E_2$, and $F_2$, of the corresponding lens segments A' to E', inclusive, will be laterally, as well as vertically, displaced relative to a position which would be occupied by the focal lines of lens segments positioned in their normal order. The vertical displacement of the focal lines $A_2$ to $F_2$ of one column of lens segments A' to F' has been diagrammatically indicated in Fig. 4. It will be additionally noted that the forward refracting surfaces of the segments, with the exception of segments C' and D', are displaced from the optical axes of such segments. In the case of segments C' and D', the optical axis is coincident with an edge surface perpendicular to the plane of the screen.

To better illustrate the operation of an optical screen of this character, reference is had to Figs. 8 and 9. As shown in Fig. 9, an optical screen 9 is mounted over the front open end of a rectangular sign casing 11. Installed within the casing 11 is a fluorescent lighting tube 13, and mounted rearwardly thereof is a reflector 14 of a form capable of illuminating all portions of the optical screen 9. Journaled in the casing is a pair of opposed, parallel, horizontally disposed rollers 15 and 16, suitable means (not shown) being provided for driving one of the rollers. Reeved about the rollers 15 and 16 is an endless belt or curtain 17 conveniently made of a clear, transparent plastic. Here it should be noted that the front reach 18 of the belt should be substantially coplaner with the focal plane of the lens segments of the optical screen 9. Mounted or formed on the belt 17 is a plurality of spaced bands 19 of either an opaque material or of a transparent colored material.

In the absence of the bands 19, rays of light from the reflector 14 will pass through the focal lines $A_2$ to $F_2$ of each of the lens segments of the optical screen and hence through each of the lens segments A' to F', inclusive, and emerge from the lens segments as parallel rays (see Fig. 4). In doing this, the light rays are merely traversing in a reverse direction the path which would be taken by parallel lines entering the front face of the optical screen. This results in the brilliant illumination of each of the lens segments A' to F'. Now if the belt 17 is rotated, the bands 19 will progressively intercept or pass through the successive rows of focal lines of the lens segments, and in so doing will either black out or color each of the lens segments corresponding to the focal lines intercepted. This, of course, results from the fact that each lens segment can be illuminated by light originating from or passing through its focal line and traversing a path reverse to the path of a parallel beam of light entering the front face of the lens segment in question. These phenomena are illustrated in Figs. 4, 7, 8, and 9. In Fig. 8, the blacked out or colored segments resulting from the interception of their corresponding focal lines by the bands 19 have been partially shaded. As the bands 19 travel across the focal plane of the optical screen, lens segments in other and various rows and columns will be progressively affected so as to produce an indiscriminate twinkling effect at the front of the optical screen. Actually, this twinkling effect occurs in a repetitive pattern, but from a practical standpoint it is very difficult to detect. The belt 17 and its bands 19, instead of being considered as a device for progressively intercepting or filtering light passing through the focal lines of the lens segments, can in the alternative be considered as a means for progressively illuminating each succeeding row of focal lines at the focal plane, and instead of continuously moving the belt in one direction, it can, of course, be reciprocated up and down through an amplitude such that each row of focal lines will be periodically illuminated. The width of the bands of light is, of course, optional as is the manner of moving them across the colinear focal lines, and the particular source of light is likewise optional.

Finally, a sheet or screen 21 having some symbols, characters, etc. stenciled thereon is placed over either side of the optical screen 9 to complete the structure.

*Alternative screen section*

The depth or thickness of the optical screen depends upon the slope of its lens segments, and more particularly, upon the depth of the lens segments having the greatest slope. If it be desired to decrease the depth of the optical screen without sacrificing the effective area of each of its lens segments, resort can be had to a die 22, such as illustrated in Fig. 6, and which is produced from the bundle 23 of bars 24 illustrated in Fig. 5. Here it will be noted that the height of each of the bars 24 is only one half of their width. The bundle is provided on one end with a cylindrical surface just as in the case of the bundle shown in Fig. 1, and then rearranged in a different order, but here the bars in each column of bars are arranged in identical pairs as illustrated in Fig. 6. More specifically, the bars of each successive pair of bars are identical. From a die of this character an optical screen such as the screen 25 illustrated in Fig. 7 can be produced. Here it will be noted that the lens segments of each pair of lens segments are identical and that the lens segments of each pair of segments have a common focal line. The focal lines of all of the lens segments of such a screen, of course, lie on a common focal plane and are located in vertically spaced rows thereon. By this expedient then, it is possible to halve the depth of the optical screen and still maintain the effect area of each of its lens segments, or to increase the effect area of the lens segments without increasing the thickness of the screen. In either case, the required angle of resolution of the characters of the sign can be maintained.

We claim:

1. In a substantially planar optical screen formed of light-transmitting material, a plurality of contiguous and integral lens segments of a plano-convex lens on one side of said screen, said segments being disposed in a plurality of adjacent rows, each row having a plurality of said lens segments, all of said lens segments having identical radii of curvature, and having focal points lying substantially in a common focal plane, the refracting surface of some of the said lens segments being displaced from the optical axis of such lens segments and successive lens segments in a row having optical axes displaced from each other whereby parallel light striking such screen will be refracted in different directions by said lens segments to a plurality of focal points in said common focal plane.

2. An optical screen as defined in claim 1 wherein all of said lens segments are convex cylindrical lens segments.

3. An optical screen as defined in claim 1 wherein each of said lens segments has a polygonal configuration in plan.

4. An optical screen as defined in claim 1 wherein the outermost extremities of the refracting surfaces of all of said lens segments lie in a common plane.

5. An optical screen as defined in claim 1 wherein all of said lens segments are convex spherical lens segments.

6. An optical screen as defined in claim 1 wherein the plane surfaces of said lens segments lie in a common plane forming one side of the screen.

7. As an article of manufacture an integral, substantially planar optical screen formed of light-transmitting material, said screen being comprised of a plurality of continuous screen sections, each of said screen sections including a plurality of contiguous and integral lens segments of a plano-convex lens on one side of said screen, said lens segments being disposed in a plurality of adjacent rows, each row having a plurality of said lens segments, all of said lens segments having identical radii of curvature and focal points lying in a common focal plane, the refracting surface of some of said lens segments being displaced from the optical axis of such lens segments and successive lens segments in a row having optical axes displaced from each other whereby parallel light striking said screen will be refracted in different directions by said lens segments to a plurality of focal points in said common focal plane.

References Cited in the file of this patent

UNITED STATES PATENTS

| Number | Name | Date |
|---|---|---|
| 592,631 | Hollander | Oct. 26, 1897 |
| 1,925,096 | Hunter | Sept. 5, 1933 |
| 2,151,236 | Schwartz et al. | Mar. 21, 1939 |
| 2,258,164 | Genies | Oct. 7, 1941 |
| 2,268,351 | Tanaka | Dec. 30, 1941 |
| 2,271,196 | Kaszab | Jan. 27, 1942 |
| 2,326,042 | Lessman | Aug. 3, 1943 |
| 2,441,747 | Beshgetoor | May 18, 1948 |
| 2,538,638 | Wilson | Jan. 16, 1951 |
| 2,716,909 | Rupert | Sept. 6, 1955 |

UNITED STATES PATENT OFFICE

CERTIFICATE OF CORRECTION

Patent No. 2,915,935                            December 8, 1959

Rudolf Pabst et al.

It is hereby certified that error appears in the above numbered patent requiring correction and that the said Letters Patent should read as corrected below.

In the grant, lines 2 to 4, for "assignors to Prisms Signs Inc., of San Mateo, California, a corporation of California," read -- assignors to Prism Signs Inc., of San Mateo, California, a corporation of California, --; line 13, for "Prisms Signs Inc. its successors" read -- Prism Signs Inc., its successors --; in the heading to the printed specification, lines 4 and 5, for "assignors to Prisms Signs Inc., San Mateo, Calif., a corporation of California" read -- assignors to Prism Signs Inc., San Mateo, Calif., a corporation of California --.

Signed and sealed this 21st day of June 1960.

(SEAL)
Attest:

KARL H. AXLINE
Attesting Officer

ROBERT C. WATSON
Commissioner of Patents